(12) United States Patent
Iwasaki et al.

(10) Patent No.: US 8,435,613 B2
(45) Date of Patent: *May 7, 2013

(54) DISPLAY STRIP

(75) Inventors: Yoshio Iwasaki, Shiga (JP); Yukio Nakagawa, Shiga (JP); Tadao Oota, Kyoto (JP); Naoji Ichise, Kyoto (JP)

(73) Assignee: Ishida Co., Ltd., Kyoto (JP)

( * ) Notice: Subject to any disclaimer, the term of this patent is extended or adjusted under 35 U.S.C. 154(b) by 704 days.

This patent is subject to a terminal disclaimer.

(21) Appl. No.: 11/565,595

(22) Filed: Nov. 30, 2006

(65) Prior Publication Data

US 2007/0092677 A1  Apr. 26, 2007

Related U.S. Application Data

(63) Continuation of application No. 10/750,543, filed on Dec. 31, 2003, now Pat. No. 7,160,595, which is a continuation-in-part of application No. 10/404,920, filed on Mar. 31, 2003, now abandoned.

(30) Foreign Application Priority Data

Aug. 30, 2002  (JP) ................................. 2002-254972
Nov. 1, 2002   (JP) ................................. 2002-320167

(51) Int. Cl.
*B32B 33/00* (2006.01)

(52) U.S. Cl.
USPC ........................... 428/35.2; 428/40.1; 428/200

(58) Field of Classification Search ................ 428/35.2, 428/40.1, 200
See application file for complete search history.

(56) References Cited

U.S. PATENT DOCUMENTS

| 3,029,939 A | 4/1962 | Feldman |
| 3,241,662 A | 3/1966 | Robinson et al. |
| 3,864,895 A | 2/1975 | Petrea |
| 3,897,295 A | 7/1975 | Dowbenko et al. |

(Continued)

FOREIGN PATENT DOCUMENTS

| DE | 43 13 136 | 10/1994 |
| DE | 19941431 A1 | 3/2001 |

(Continued)

OTHER PUBLICATIONS http://www.reltekllc.com/adhesives-for-polypropylene.htm (Mar. 11, 2009).*

(Continued)

*Primary Examiner* — Gerard Higgins
*Assistant Examiner* — Sathavaram I Reddy
(74) *Attorney, Agent, or Firm* — Hogan Lovells US LLP

(57) ABSTRACT

It is an object of the present invention to provide a display strip with which the process of attaching product-enclosed bags can easily be automated and from which the product-enclosed bags can easily be detached without having their appearance degraded.
The present invention is directed to a display strip for allowing a plurality of product-enclosed bags to be attached thereto for the purpose of arrangement and display, which comprises at least a substrate layer and a sealant layer that contains an easy-peelable resin composition comprising an adhesive component and a component for cohesion failure, said the sealant layer is bondable to a surface of the bag by heat sealing, and when the surface of the bag bonded to the sealant layer by heat sealing is peeled from the sealant layer, the sealant layer is broken.

10 Claims, 15 Drawing Sheets

U.S. PATENT DOCUMENTS

| | | | |
|---|---|---|---|
| 4,013,188 | A | 3/1977 | Ray |
| 4,235,365 | A | 11/1980 | Yoshii et al. |
| 4,337,862 | A | 7/1982 | Suter |
| 4,364,989 | A * | 12/1982 | Moyle ............. 428/216 |
| 4,370,369 | A | 1/1983 | Bonis |
| 4,415,087 | A | 11/1983 | Clayton et al. |
| 4,427,744 | A | 1/1984 | Hume, III |
| 4,629,639 | A | 12/1986 | Lucas |
| 4,784,708 | A | 11/1988 | Allen |
| 4,817,805 | A | 4/1989 | Rodriquez |
| 4,886,690 | A | 12/1989 | Davis et al. |
| 5,120,781 | A | 6/1992 | Johnson, Jr. |
| 5,126,176 | A | 6/1992 | Blaskovitz et al. |
| 5,145,737 | A | 9/1992 | Boiron et al. |
| 5,209,972 | A | 5/1993 | Super et al. |
| 5,366,777 | A | 11/1994 | Bown et al. |
| 5,401,533 | A | 3/1995 | Borland |
| 5,433,060 | A | 7/1995 | Gur et al. |
| 5,589,246 | A | 12/1996 | Calhoun |
| 5,625,006 | A | 4/1997 | Callahan et al. |
| 5,919,863 | A | 7/1999 | Seppanen et al. |
| 6,221,448 | B1 | 4/2001 | Baetzold et al. |
| 6,405,778 | B1 | 6/2002 | Belt |
| 6,481,184 | B1 * | 11/2002 | Junker et al. ............. 53/413 |
| 6,500,536 | B1 | 12/2002 | Yamada et al. |
| 6,502,986 | B1 | 1/2003 | Bensur et al. |
| 6,960,635 | B2 * | 11/2005 | Stevens et al. ............. 526/161 |
| 7,011,883 | B2 | 3/2006 | Iwasaki et al. |
| 7,147,913 | B2 | 12/2006 | Iwasaki et al. |
| 7,160,595 | B2 * | 1/2007 | Iwasaki et al. ............. 428/40.1 |
| 2003/0113519 | A1 | 6/2003 | Waserman et al. |
| 2004/0040919 | A1 | 3/2004 | Iwasaki et al. |
| 2004/0043175 | A1 | 3/2004 | Iwasaki et al. |
| 2004/0197514 | A1 | 10/2004 | Iwasaki et al. |
| 2004/0197577 | A1 | 10/2004 | Iwasaki et al. |
| 2005/0123749 | A1 | 6/2005 | Iwasaki |
| 2006/0086682 | A1 | 4/2006 | Iwasaki et al. |
| 2006/0163183 | A1 | 7/2006 | Iwasaki |
| 2007/0092677 | A1 | 4/2007 | Iwasaki et al. |

FOREIGN PATENT DOCUMENTS

| | | | |
|---|---|---|---|
| EP | 000444865 | A2 | 9/1991 |
| EP | 0 576 993 | | 6/1993 |
| EP | 0708162 | A2 | 4/1996 |
| EP | 0 742 772 | B1 | 6/1999 |
| EP | 0 942 055 | A1 | 9/1999 |
| EP | 0 989 162 | A1 | 3/2000 |
| EP | 1085069 | A1 | 3/2001 |
| EP | 1 167 220 | | 1/2002 |
| JP | 44-1589 | | 1/1969 |
| JP | 47042226 | Y1 | 12/1972 |
| JP | 62251327 | | 11/1987 |
| JP | 63132051 | | 6/1988 |
| JP | 01179235 | A | 7/1989 |
| JP | 3-69461 | | 7/1991 |
| JP | 03-200562 | | 9/1991 |
| JP | 04001151 | | 1/1992 |
| JP | 04-115946 | | 4/1992 |
| JP | 7-289398 | | 11/1995 |
| JP | 08-276966 | | 10/1996 |
| JP | 08-290526 | | 11/1996 |
| JP | 10-80345 | | 3/1998 |
| JP | 10-202801 | | 8/1998 |
| JP | 10202801 | A * | 8/1998 |
| JP | 10-230971 | | 9/1998 |
| JP | 10237405 | A | 9/1998 |
| JP | 11148054 | A | 6/1999 |
| JP | 2000-129234 | | 5/2000 |
| JP | 2000-142650 | | 5/2000 |
| JP | 2000-219789 | | 8/2000 |
| JP | 2001-122288 | | 5/2001 |
| JP | 2001-315836 | | 11/2001 |
| JP | 2002-37279 | | 2/2002 |
| TW | 282437 | B | 8/1996 |
| TW | 499362 | B | 8/2002 |
| WO | 9308982 | A2 | 5/1993 |
| WO | 9852823 | | 11/1998 |
| WO | 0167926 | A1 | 9/2001 |
| WO | 2005120175 | A2 | 12/2005 |

OTHER PUBLICATIONS

European Search Report for corresponding European application No. 03778919.5-2038.

Ullmann's Encyclopedia of Industrial Chemistry, 5th Ed., vol. A11 (1988), pp. 105-106.

Schimtz, Peter et al., "Films." Ullmann's Encyclopedia of Industrial Chemistry, 5th Ed., vol. A11 (1988), pp. 85-95, 108-110.

* cited by examiner a b c a    b a′    b′ a b

DISPLAY STRIP

RELATED APPLICATIONS

This is a continuation of application Ser. No. 10/750,543 filed Dec. 31, 2003 now U.S. Pat. No. 7,160,595, which is a continuation-in-part of application Ser. No. 10/404,920 filed Mar. 31, 2003 now abandoned, which claims priority under 35 USC 119 in Japanese Patent Application No 2002-254972 filed Aug. 30, 2002 and Japanese Patent Application No. 2002-320167 filed Nov. 1, 2002, which applications are incorporated by reference in their entireties.

TECHNICAL FIELD

The present invention relates to a display strip for allowing a plurality of product-enclosed bags to be attached thereto for the purpose of arrangement and display.

BACKGROUND ART

Some products such as snack foods are generally packed and sold in pillow packages (such as vertical pillow types and horizontal pillow types). In many cases, such product-enclosed bags are arranged and sold on display racks in stores. In such cases, each and every bag has to be placed on the racks by hand, and the display place for sale is restricted to the given racks.

A known display method for product sale, called strip bag display, requires no display rack. As shown in FIG. 1, the strip bag display provides an arrangement in which products are each attached to a tape material with a certain width, called a display strip, and suspended. This display form needs no display rack and enables display and sale at any place such as a place beside a register and a front desk area of a hotel.

In a conventional display strip form, for example, an adhesive tape is attached on a paper or resin tape that has preliminarily punched-holes in certain positions, through which product-enclosed bags are each attached to the pressure-sensitive adhesive tape. In another form, for example, a paper or resin tape has resin hooks preliminarily fixed thereon in certain positions, and product-enclosed bags are each formed with a punched hole and hung on each hook through the hole.

However, these display strip forms have difficulty in automating the process of attaching the product-enclosed bags to the display strip. Thus, the strip bag display has not been widely used yet.

Against this problem, yet another display strip is proposed, in which a heat seal layer is formed on one side. To such a display strip, the product-enclosed bag can directly be attached by heat sealing. With this display strip, it is very easy to automate a continuous process including the steps of enclosing a product in a bag and attaching the product-enclosed bag to the strip.

The process of attaching the product-enclosed bag to this display has to be performed with a sufficient seal strength so that the bag will be prevented from spontaneously falling under it own weight during display in stores or prevented from coming off during transport. If high seal strength is used to attach the product-enclosed bag to the display strip, however, the surface layer of the bag can be broken in the process of detaching the bag from the strip. Such breakage can lead to poor appearance of the product due to the damage of the printed surface. At worst, such damage can extend to the unsealed portion and cause peeling so that a scar or hole can be formed in the bag, which should otherwise maintain the product quality.

SUMMARY OF THE INVENTION

It is an object of the present invention to provide a display strip with which the process of attaching product-enclosed bags can easily be automated and from which the product-enclosed bags can easily be detached without having their appearance degraded.

The present invention is directed to a display strip for allowing a plurality of product-enclosed bags to be attached thereto for the purpose of arrangement and display, which comprises at least a substrate layer and a sealant layer that contains an easy-peelable resin composition comprising an adhesive component and a component for cohesion failure, said the sealant layer is bondable to a surface of the bag by heat sealing, and when the surface of the bag bonded to the sealant layer by heat sealing is peeled from the sealant layer the sealant layer is broken.

The present invention is also directed to another display strip for allowing a plurality of product-enclosed bags to be attached thereto for the purpose of arrangement and display, which comprises at least a substrate layer and a sealant layer that contains an easy-peelable resin composition comprising an adhesive component and a component for cohesion failure, said the sealant layer is bondable to a surface of the bag by heat sealing, and when the surface of the bag bonded to the sealant layer by heat sealing is peeled from the sealant layer, the sealant layer is broken and the peeling is started under an initial load lower than the tensile break strength of the surface layer of the bag and, continuous or intermittent application of a load corresponding to the initial load is necessary until the peeling is completed.

The adhesive component is preferably at least one selected from the group consisting of polypropylene, a copolymer of propylene and any other olefin, and low density polyethylene. The copolymer of propylene and any other olefin is preferably a copolymer of propylene and an α-olefin with 2 or 4 to 12 carbon atoms. The component for cohesion failure is preferably a styrene polymer and/or polybutene-1.

The sealant layer preferably comprises a supporting layer and an adhesive layer containing the easy-peelable resin composition. In this case, the supporting layer preferably contains at least one of the adhesive layer-constituting components. A component for cohesion failure is preferably contained in the adhesive layer-side surface of the supporting layer. Such a component for cohesion failure is preferably a styrene polymer and/or polybutene-1. The adhesive layer preferably has a thickness of 1 to 30 μm, and the supporting layer preferably has a thickness of 5 to 50 μm. The sealant layer is preferably formed on substantially all over the surface.

The substrate layer preferably comprises at least one selected from the group consisting of biaxial oriented polypropylene, biaxial oriented polyethylene terephthalate, metal foil, and paper.

The substrate layer and the sealant layer are preferably stacked with an adhesive. Alternatively, the substrate layer and the sealant layer are preferably stacked with a layer comprising polyethylene, an ethylene-(meth)acrylic acid copolymer, or an ionomer of the ethylene-(meth)acrylic acid copolymer placed between the substrate layer and the sealant layer.

The bag preferably comprises at least a sealant layer and a substrate layer. The sealant layer preferably comprises at least one selected from the group consisting of polypropylene, a copolymer of propylene and any other olefin, and low density polyethylene. The sealant layer also preferably comprises a heat-sealable biaxial oriented polypropylene film. The sealant layer and the substrate layer are preferably laminated via an adhesive. The sealant layer and the substrate layer are laminated via an intermediate layer and, the sealant layer and the intermediate layer are laminated via an adhesive.

Also included in the present invention is a display for products wherein the display strip of the present invention and a product-enclosed bag are attached by heat sealing.

Figure 1:
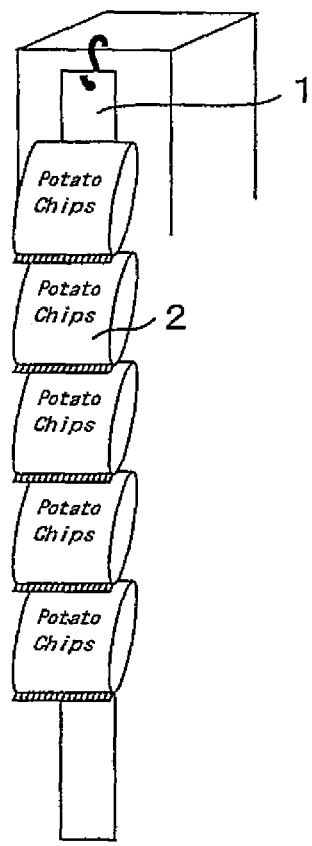
FIG. 1 is a schematic view showing the strip bag display.

In the drawings, reference numeral 1 represents a display strip, 2 represents a product-enclosed bag, 3 represents a sealant layer, 4 represents a substrate layer, 5 represents a sealant layer (bag-side), 6 represents a print layer (bag-side), 7 represents a sealed site, 8 represents a transparent sealant layer (a *cast polypropylene film containing a styrene-butadiene copolymer), 9 represents a polyethylene layer, 10 represents a print layer, 11 represents a substrate layer (a biaxial oriented polyethylene terephthalate film), and 12 represents a paper.

DETAILED DISCLOSURE OF THE INVENTION

The present invention is described in detail below.

The display strip of the present invention comprises at least the substrate layer and the sealant layer that contains the easy-peelable resin composition.

In the description, the term "easy-peelable" refers to a property with which a film or the like attached by a certain method such as heat sealing can easily be detached from the adherend by hand without being broken. The easy-peelable resin composition refers to a resin composition that can provide the easy-peelable property for the bonded structure of the film or the like and the adherend. An object of the present invention is to provide a display strip from which the bag can easily be detached without having its surface damaged. Therefore, cohesion failure is preferably allowed to occur mainly in the display strip by a tensile force lower than the tensile break strength of the bag surface layer. In this case, the cohesion failure may be accompanied by peeling between the display strip-constituting layers or peeling at the interface between the display strip and the bag surface. In the present invention, therefore, the easy-peelable resin composition contains not only a component that contributes to the adhesion to the bag surface (hereinafter such a component may be referred to as the adhesive component) but also a component that contributes to the easy-peelable property (hereinafter such a component may be referred to as the component for cohesion failure).

The adhesive component may be any material that can make the sealant layer heat-sealable to the bag surface. Many of the bags now available in Europe and the United States have a sealant surface layer of heat-sealable biaxial oriented polypropylene (OPH). In view of this fact, the adhesive component is preferably at least one selected from the group consisting of polypropylene, a copolymer of propylene and any other olefin such as a propylene-ethylene-butene terpolymer, and low density polyethylene such as single-site catalyzed linear polyethylene. More preferably, the adhesive component is a composition comprising: polypropylene or the copolymer of propylene and any other olefin as a main component; and low density polyethylene for providing a lower melting point. Examples of any other olefin include α-olefins with 2 to 12 carbon atoms (exclusive of α-olefins with 3 carbon atoms) such as ethylene, 1-butene, 3-methyl-1-butene, 3-methyl-1-pentene, 4-methyl-1-pentene, 4-dimethyl-1-pentene, vinylcyclopentene, and vinylcyclohexane. Preferred examples of the copolymer of propylene and any other olefin include bipolymers or terpolymers of propylene and any of the above monomers.

The component for cohesion failure may be any material that can provide the sealant layer with an easy-peelable property, with which the sealant layer can be more easily broken than the adherend bag surface layer. Examples of such a component include a styrene polymer and polybutene-1.

In the description, the styrene polymer refers to a resin comprising a styrene type monomer units such as styrene, α-methylstyrene, and chlorostyrene. More specifically, examples of the styrene polymer include a simple polymer of the styrene monomer and a copolymer of the styrene type monomer and any other monomer. The copolymer may include a graft copolymer and a block copolymer. Examples of any other monomer include acrylonitrile; (meth)acrylic acid; (meth)acrylate ester; an α-olefin with 2 to 12 carbon atoms such as ethylene, propylene, and butylene; and a conjugated diene monomer with 4 to 15 carbon atoms such as butadiene and isoprene.

Examples of the styrene polymer include styrene elastomers such as styrene-butylene copolymers, styrene-butylene-styrene block copolymers, styrene-isoprene copolymers, styrene-isoprene-styrene block copolymers, styrene-butadiene copolymers, and styrene-butadiene-olefin block copolymers. One of these styrene polymers and polybutene-1 may be used alone, or two or more of these styrene polymers and polybutene-1 may be used in combination.

The sealant layer may comprise a single layer or a plurality of layers. In the sealant layer comprising a single layer, the content of each of the adhesive component and the component for cohesion failure is not particularly limited. Such a content may be appropriately selected depending on the surface layer of the adherend bag. Generally, a higher content of the adhesive component provides a higher heat-sealable property, and a higher content of the component for cohesion failure enhances the occurrence of the cohesion failure. In the sealant layer, the content of the adhesive component may be higher at a side to be heat-sealed to the bag.

If the sealant layer comprises a plurality of layers, it preferably comprises an adhesive layer that contains the easy-peelable resin composition and is allowed to adhere to the bag surface layer by heat sealing; and a supporting layer that supports the adhesive layer and couples the substrate layer to the adhesive layer. In this case, the adhesive layer may also comprise a plurality of layers. In such an adhesive layer, the content of the component for cohesion failure may be higher in the layer to be in contact with the bag and may decrease as it goes toward the supporting layer. In such a case, the following performance can be attained: after the application of the initial load as described below, the load that has to be applied until the peeling is completed can be greater than the initial load and can increase with the distance between chucks. The supporting layer preferably comprises a composition that contains the adhesive layer-constituting component such as polypropylene, polyethylene and a copolymer of ethylene or propylene and any other α-olefin, or an analogue component thereof and that has a slightly higher melting point than that of the adhesive layer, in terms of assurance of the adhesion to the adhesive layer and the support for the adhesive layer. In such a case, the following performance can be attained: even when inter layer breakage occurs between the adhesive layer and the supporting layer, a load corresponding to the initial load must be continuously or intermittently applied until the peeling is completed. This is because such a supporting layer has a high affinity for the adhesive layer.

The adhesive layer preferably has a thickness of 1 to 30 μm. If the thickness is less than 1 μm, the resulting seal strength can be insufficient. If the thickness is more than 30 μm, the heat-sealing process can take a long time. The supporting layer preferably has a thickness of 5 to 50 μm. If the thickness is less than 5 μm, the supporting layer may have an insufficient function. If the thickness is more than 50 μm, the heat-sealing process can take a long time.

The sealant layer is preferably transparent. The transparent sealant layer can be prevented from giving poor appearance, even when the debris of the sealant layer adheres to the product-enclosed bag after the peeling process.

In the present invention, the sealant layer may be formed substantially all over the surface of the display strip, may be formed in a stripe pattern, or may be formed only in a certain position where the product will be attached. The sealant layer formed substantially all over the surface of the display strip is preferred, because the product can be attached to any position in the display strip. The term "substantially" means that a punched position, an edge portion free from the attachment of the product, and the like may be excluded.

The sealant layer is bondable, by heat sealing, to the surface of the product-enclosed bag, and when the surface of the bag bonded to the sealant layer by heat sealing is peeled from the sealant layer, the sealant layer is broken.

Figure 2:
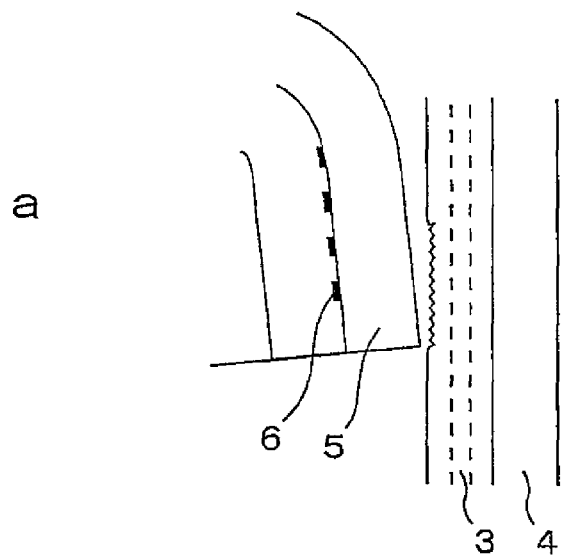
FIG. 2 is a schematic view showing how the bag is detached from the display strip of the present invention.
Figure 2:
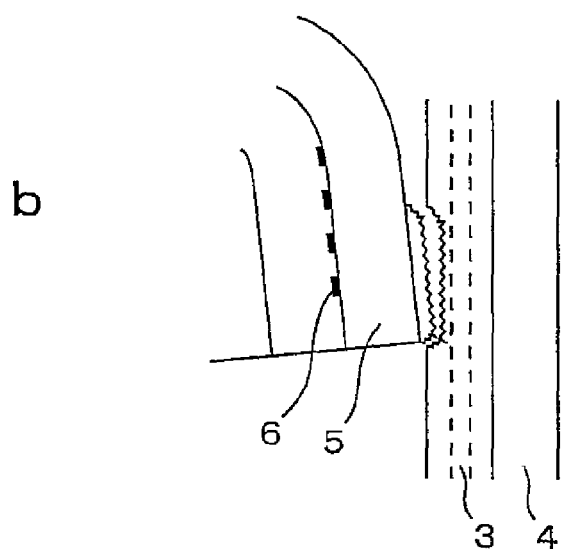
Figure 2:
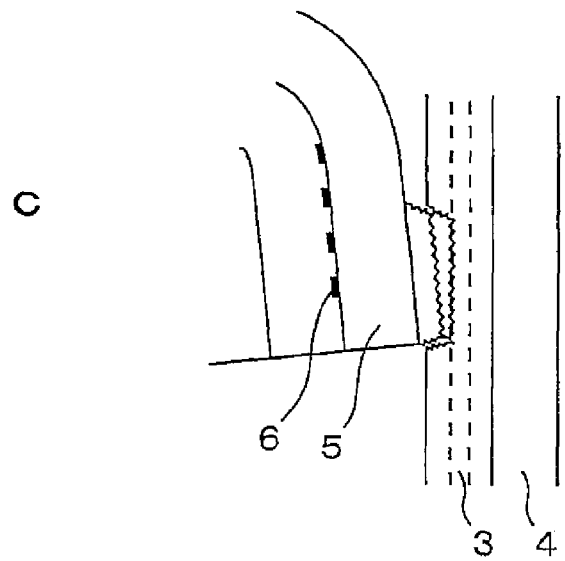

Basic patterns of the sealant layer breakage are shown in FIG. 2. In the pattern as shown in FIG. 2a, the breakage occurs substantially at the interface between the sealant layer and the bag, and a very small surface part of the sealant layer is broken. In the pattern as shown in FIG. 2b, cohesion failure occurs in the sealant layer. In the pattern as shown in FIG. 2c, cohesion failure occurs in the sealant layer, and then inter layer break occurs when the breakage reaches a boundary between a plurality of layers that constitute the sealant layer. The breakage of the sealant layer may occur in any one of the above patterns or in any combination of the above patterns.

Figure 3:
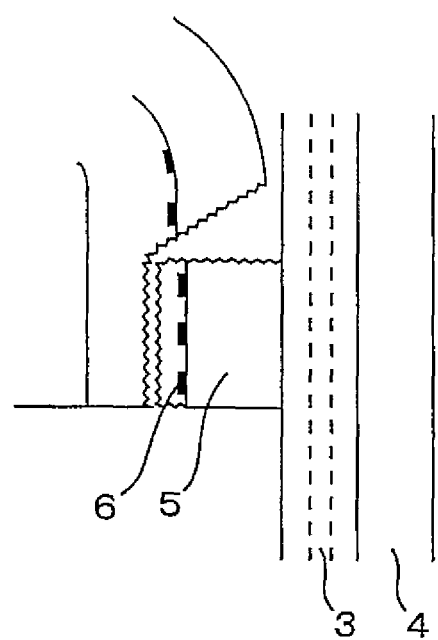
FIG. 3 is a schematic view showing how the bag is detached from a conventional display strip.

When the product-enclosed bag bonded to the conventional display strip by heat sealing is detached from it, the print layer and the like can also be broken by the impact from the cohesion failure of the bag surface as shown in FIG. 3. In this case, the printed face of the bag can be broken, and the unsealed portion can also be broken. In the display strip of the present invention, the sealant layer of the display strip contains the easy-peelable resin composition and therefore can be broken more easily than the bag surface. As shown in FIG. 2, therefore, the sealant layer of the display strip is surely broken in the peeling process so that the product-enclosed bag can be detached without having its appearance degraded.

In a preferred mode of the present invention, when the bag surface bonded to the sealant layer of the display strip by heat sealing is detached from it, the peeling is started under an initial load lower than the tensile break strength of the bag surface layer, and a load corresponding to the initial load has to be continuously or intermittently applied until the peeling is completed.

Figure 5:
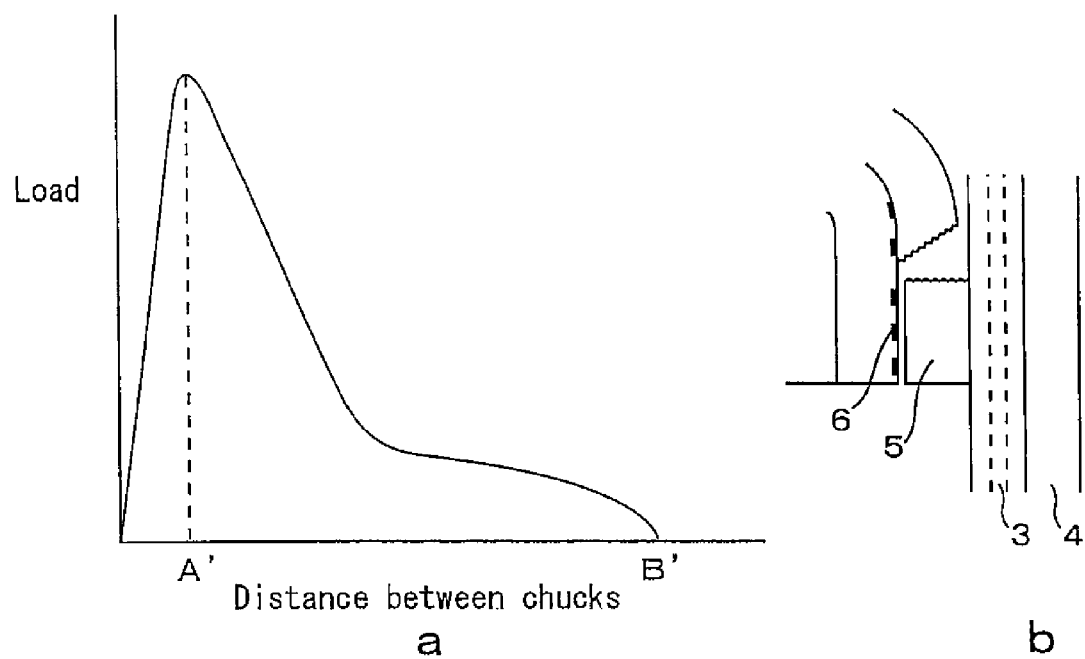
FIG. 5 is a schematic diagram showing how the load changes when the bag is detached from the conventional display strip.

The inventors have analyzed the cases when the bags are damaged in the process of detaching the heat-sealed bags from the conventional display strips. In the analysis, the applied loads are measured while the heat-sealed bag is detached from the display strip, and the measured loads are plotted against the distance between the display strip and the bag (the distance between the chucks). As a result, in many of the damaged bag cases, it has been found that the plotted graph has such a pattern as shown in FIG. 5a. Such a pattern suggests that the peeling can proceed as follows. Referring to FIG. 5b, when the early stage of peeling reaches a certain load (the distance between the chucks: A'), the surface layer of the bag is cracked at its outermost surface. Therefrom, the breakage proceeds inside the surface layer, and the load is sharply reduced so that the peeling proceeds under a very light load until completed (the distance between the chucks: B'). Herein, the surface layer refers to a single outer surface layer in a bag that is made of two to five layer laminated film, or if the outer surface portion of the bag is made of heat-sealable biaxial oriented polypropylene, the surface layer refers to not only the outermost heat-sealable layer but also the heat-sealable biaxial oriented polypropylene layer.

Figure 4:
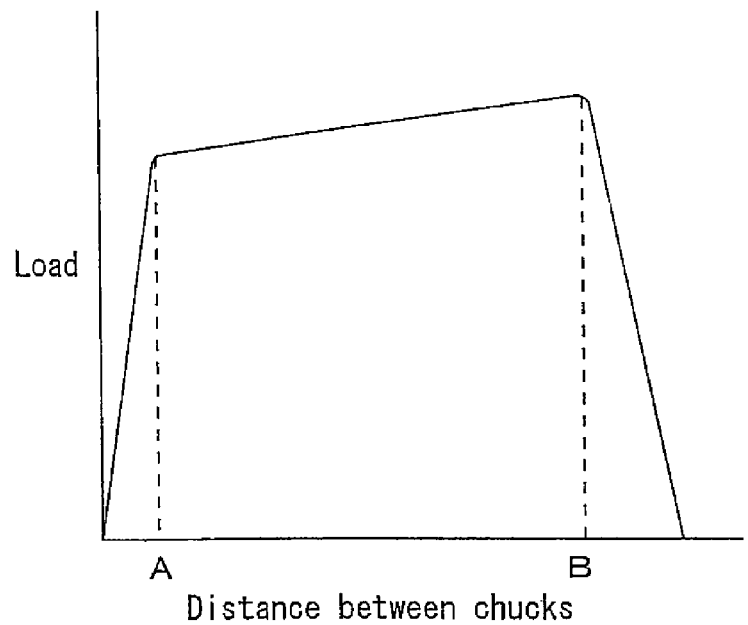
FIG. 4 is a schematic diagram showing how the load changes when the bag is detached from the display strip of the present invention.
Figure 4:
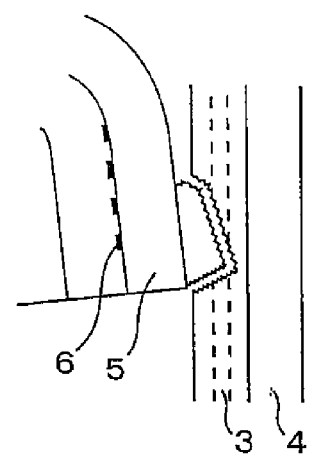
Figure 4:
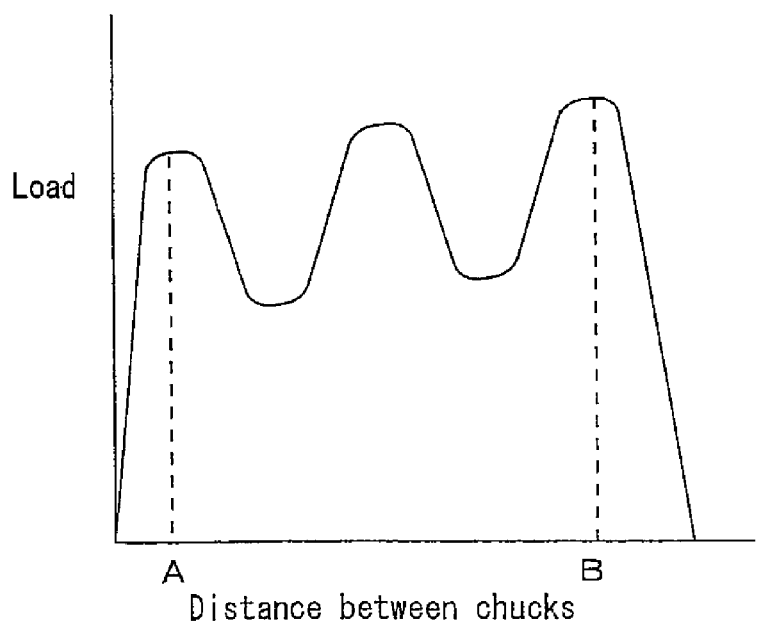
Figure 4:
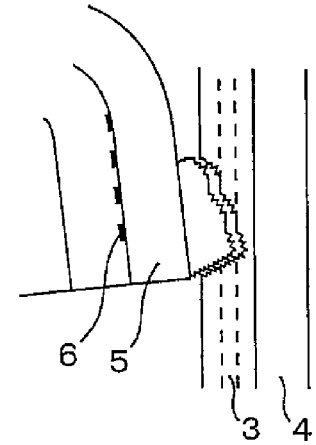

In contrast, a preferred mode of the display strip of the present invention provides a graph having such a pattern as shown in FIG. 4a or 4a', after the analysis in which the applied loads are measured while the heat-sealed bag is detached from the display strip, and the measured loads are plotted against the distance between the display strip and the bag (the distance between the chucks). FIG. 4b or 4b' schematically shows a peeling pattern in such a case. In such a case, the sealant layer contains the easy-peelable resin composition, and therefore, cohesion failure of the sealant layer occurs under an initial load lower than the tensile break strength of the bag surface layer, and peeling is started (the distance between the chucks: A). The surface layer of the bag is not broken, and therefore, the product-enclosed bag can be detached without having its appearance degraded. In a preferred manner, after the peeling is started, a load corresponding to the initial load should be continuously or intermittently applied until the peeling is completed (the distance between the chucks: B).

In order to achieve easy detachment of the product from the display strip, the peeling should be started by a relatively small force. If the load for peeling is sharply reduced after the start of peeling as in the conventional display strip case, however, the product can be easily detached even when an instant load is accidentally applied to the product during transport or display. In the preferred mode of the display strip of the present invention, after the start of peeling, a load corresponding to the initial load must be continuously or intermittently applied until the peeling is completed. Such a feature can prevent accidental detachment of the product.

In the display strip of the present invention, for example, such a feature is achieved as follows. The sealant layer contains the easy-peelable resin composition. Therefore, before the surface of the bag is broken, the breakage occurs at the interface between the bag surface and the sealant layer, or cohesion failure occurs in the sealant layer. In addition, where the sealant layer comprises a plurality of layers, the layers are formed with a high inter layer cohesive strength. Therefore, inter layer breakage can be prevented and otherwise inter layer breakage cannot proceed unless a relatively heavy load is applied.

The continuous application of a load corresponding to the initial load means that after the initial load application, the load, which has to be applied until the peeling is completed, is about the same as the initial load. However, such a load may be somewhat more or less than the initial load unless sharply reduced. Preferably, a load within the range of ±50% of the initial load is continuously applied. More preferably, after the initial load application, the necessary load increases with the distance between the chucks (FIG. 4a).

The intermittent application of a load corresponding to the initial load means that even if the load is significantly reduced after the initial load application, the necessary load significantly increases again to form a peak within the range of ±50% of the initial load before the peeling is completed (FIG. 4a').

In the display strip of the present invention, the substrate layer may be made of any material. A preferred material for the substrate has a sufficient strength for the application, in which many products are attached and suspended, and has a heat resistance, which can prevent melting or degradation during heat sealing. For example, the material for the substrate layer is preferably at least one selected from the group consisting of biaxial oriented polypropylene, biaxial oriented polyethylene terephthalate, metal foil, and paper.

The thickness of the substrate layer is not particularly limited but is preferably from 30 to 200 µm. If the thickness is less than 30 µm, the strength can be insufficient so that the substrate layer can be broken during display or in the process of detaching the product-enclosed bag. If the thickness is more than 200 µm, the substrate layer can serve as a heat insulator so that the thermal conduction to the sealant layer can be insufficient during heat sealing.

In the display strip of the present invention, a further layer comprising polyethylene, an ethylene-(meth)acrylic acid copolymer, or an ionomer of the ethylene-(meth)acrylic acid copolymer is preferably provided between the substrate layer and the sealant layer. These resins are flexible and have a high tensile elongation rate. Therefore, any of these resins may be layered to increase the overall strength of the display strip of the present invention. If the display strip has punched holes for suspension, such layered resin can provide a resistance against a load that is applied to the portion around the hole when the product is detached. Such a layer may also have the function of bonding the substrate layer to the sealant layer. Such a layer may be formed by extruding and molding a desired resin between the substrate layer and the sealant layer. Alternatively, the substrate layer and the sealant layer may be stacked through an adhesive by any known dry lamination process.

The thickness of the layer comprising the polyethylene or the like is not particularly limited but is preferably from 5 to 50 µm. If the thickness is less than 5 µm, improvement in the strength can be insufficient. If the thickness is more than 50 µm, the entire thickness of the display strip can be so large that a thermal insulation effect can be produced.

In the display strip of the present invention, any other functional layer may be provided between the substrate layer and the sealant layer. For example, such a layer is a print layer or the like. In the case that the substrate layer is made of polymer, the print layer is preferably formed between the substrate layer and the sealant layer. In the case that the substrate layer is made of paper, the printing is preferably carried out on a face other than the paper-layered face.

The display strip of the present invention may have any shape, for example including a tape shape and a sheet shape. At one end of the display strip of the present invention, a hole may be punched, or a clip may be provided. A hook can be engaged in the punched hole for the purpose of suspending and displaying the display strip to which products are attached. The punching process is particularly preferred, because it can easily be carried out in a series of automated processes. When the display strip is hung on the hook through the punched hole, the portion around the hole tends to undergo stress and to be broken. Therefore, the substrate layer may preferably be reinforced, or a polyethylene layer may preferably be provided between the substrate layer and the sealant layer.

Any conventional bag may be used the bag for enclosing a product to be attached to the display strip of the present invention. In particular, the bag preferably comprises at least the sealant layer and the substrate layer. The sealant layer on the surface of the bag preferably comprises at least one selected from the group consisting of polypropylene, a copolymer of propylene and any other olefin, low density polyethylene, and an ethylene-vinyl acetate copolymer. The sealant layer on the surface of the bag also preferably comprises a heat-sealable biaxial oriented polypropylene (OPH) film. The heat-sealable biaxial oriented polypropylene (OPH) film generally refers to a biaxial oriented polypropylene film (OPP) that is made heat-sealable with a very thin terpolymer layer formed thereon, wherein the terpolymer layer comprises a heat-sealable resin such as a propylene-ethylene-butene terpolymer. In particular, such a bag material is widely used in Europe and the United States. The sealant layer of the bag surface is preferably free of the component for cohesion failure.

The sealant layer composing the bag for enclosing a product and the substrate layer are preferably laminated via an adhesive. Lamination via an adhesive may give high inter layer adhesive force. Therefore, when the bag is detached from the display strip of the present invention, fracture between layers of the bag does not occurred but fracture at interface between the display strip and the bag or at inside of the display strip tends to occur.

In addition, the sealant layer composing the bag for enclosing a product and the substrate layer may be laminated via an intermediate layer. In this case, the sealant layer and the intermediate layer are preferably laminated via an adhesive.

Lamination of the sealant layer and intermediate layer via an adhesive may give high inter layer adhesive force. Therefore, when the bag is detached from the display strip of the present invention, fracture between layers of the bag does not occurred but fracture at interface between display strip and the bag or at inside of display strip tends to occur.

The bag for enclosing a product may be produced by co-extruding a heat-sealable polymer together with a polymer composing the substrate layer, or by coating heat-sealable polymer, such as a hot melt adhesive on the substrate layer.

Examples of the bag for enclosing a product to be attached to the display strip of the present invention include such as a bag comprising the structure of biaxial oriented polypropylene (OPP) layer/print layer/adhesive layer/polyethylene (PE) layer/aluminum vapor-deposited polyethylene terephthalate (PET) layer/polyethylene (PE) layer/cast polypropylene (CPP) layer; a bag comprising the structure of biaxial oriented polypropylene (OPP) layer/print layer/polyethylene (PE) layer/aluminum vapor-deposited polyethylene terephthalate (PET) layer/polyethylene (PE) layer/cast polypropylene (CPP) layer; a bag comprising the structure of biaxial oriented polypropylene (OPP) layer/print layer/aluminum vapor-deposited cast polypropylene (CPP) layer; a bag comprising the structure of biaxial oriented polypropylene (OPP) layer/print layer/polyethylene (PE) layer/aluminum vapor-deposited cast polypropylene (CPP) layer; a bag comprising the structure of transparent vapor-deposited biaxial oriented polyethylene terephthalate (PET) layer/print layer/cast polypropylene (CPP) layer; a bag comprising the structure of heat-sealable biaxial oriented polypropylene (OPH) layer/print layer/polyethylene (PE) layer/aluminum vapor-deposited heat-sealable biaxial oriented polypropylene (OPH) layer; a bag comprising the structure of heat-sealable biaxial oriented polypropylene (OPH) layer/print layer/polyethylene (PE) layer/aluminum vapor-deposited cast polypropylene (CPP) layer; and a bag comprising the structure of heat-sealable biaxial oriented polypropylene (OPH) layer/print layer/adhesive layer/polyethylene (PE) layer/aluminum vapor-deposited cast polypropylene (CPP) layer.

The display strip of the present invention may be produced by any known process. For example, the display strip may be produced by the step of bonding, through an adhesive, the substrate layer and the sealant layer, which are each independently prepared by extrusion molding or the like. Alternatively, the display strip with the above-described polyethylene layer or the like may be formed by the step of stacking the polyethylene layer or the like and the sealant layer on the substrate layer.

Alternatively, the display strip whose sealant layer comprises a plurality of layers including the peelable layer and the heat-sealable layer may be produced by co-extrusion molding process.

Figure 6:
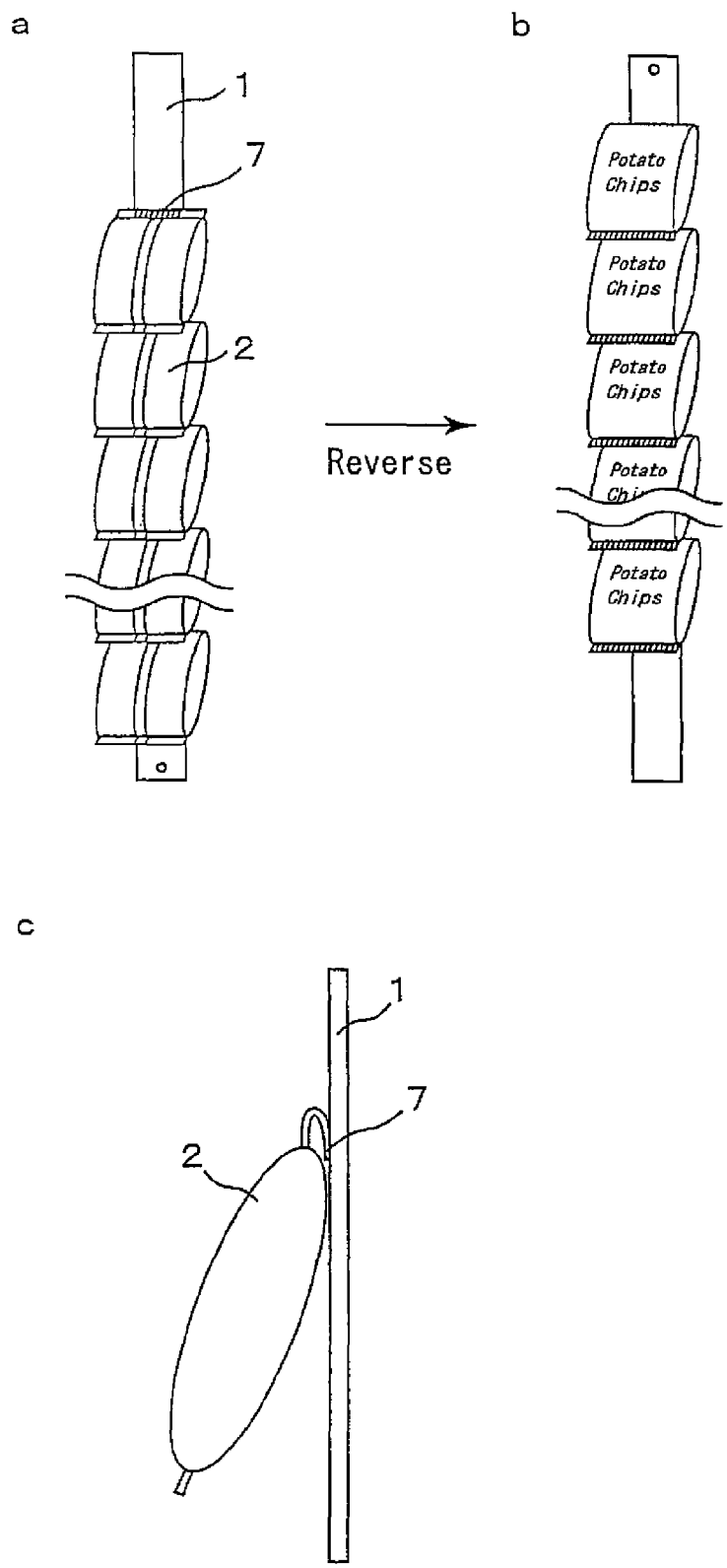
FIG. 6 is a schematic view showing an example of the process of attaching product-enclosed bags to the display strip of the present invention.

Any method may be used to attach the product-enclosed bags to the display strip of the present invention. For example, the process as shown in FIG. 6 is preferably used in the attachment. In this process, each product-enclosed bag is placed in such a manner that the front side of the bag is in contact with the display strip, and then the upper potion of each bag is heat-sealed to the display strip (FIG. 6a). After a desired number of product-enclosed bags are bonded to the display strip, each product-enclosed bag is turned upside down about the axis of the heat-sealed portion, so that the front face of each bag is reversed against the display strip (FIG. 6b). In such a state, one end of the display strip is hung on a hook or the like, and the bags are displayed. Each bag is bonded to the display strip as shown in FIG. 6c. Therefore, if each product-enclosed bag is pulled downward, it can easily be detached from the display strip by a small force.

The seal strength between the bag and the display strip is not particularly limited but is preferably 1 to 50 N/15 mm. If the strength is less than 1 N/15 mm, the product can fall under its own weight. If the strength is more than 50 N/15 mm, the suspended bag with the product enclosed therein may not be released by pulling. The seal strength is preferably from 5 to 30 N/15 mm.

Figure 7:
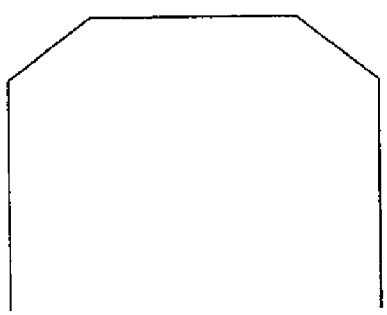
FIG. 7 is a schematic diagram showing examples of the form of a seal jaw.
Figure 7:
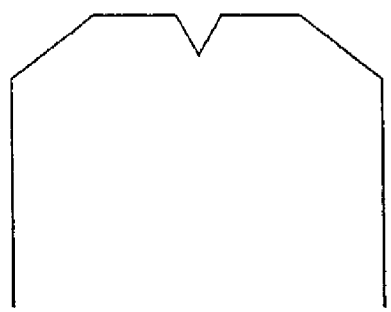

The sealed or peeled state between the bag and the display strip may significantly vary with the sealing conditions. The sealing conditions may vary with the sealing temperature and the seeling time, the seeling pressure and the shape of the seal jaw. For example, the seal jaw may have each shape as shown in FIG. 7. Optimal sealing conditions are preferably selected depending on the adhesive component and the component for cohesion failure of the sealant layer of the display strip of the present invention and the material of the bag surface layer. The width of the seal jaw may be selected depending on the desired length of the contact face between the display strip and the bag surface. Such a length substantially defines the distance between the peeling start and the peeling end in the process of peeling the bag from the display strip.

The display strip of the present invention enables the product-enclosed bag to be heat-sealed thereto and enables a large number of products to be easily attached by automation. When the product-enclosed bag is detached from the display strip of the present invention, the sealant layer of the display strip is broken so that the appearance of the bag is not degraded.

Also included in the present invention is a display for products wherein the display strip of the present invention and a product-enclosed bag are attached by heat sealing.

BEST MODE FOR CARRYING OUT THE INVENTION

The present invention is more specifically described with reference to the examples below, but such examples are not intended to limit the scope of the present invention.

EXAMPLE 1

A cohesion failure type easy-peelable film (SHOLEX Allomer film TPF1, Showa Denko Plastic Products) with a thickness of 60 µm was laminated on a biaxial oriented polyethylene terephthalate film with a thickness of 38 µm by a conventional dry lamination process. The resulting laminate was slit into display strips each with a width of 35 mm.

COMPARATIVE EXAMPLE 1

Paper with a basis weight of 70 g/m$^2$ was used as a substrate layer. A heat-sealable biaxial oriented polypropylene film (OPH) was laminated on the substrate layer. A slitter was used to slit the resulting laminate into display strips each with a width of 35 mm.

EXAMPLE 2

A cohesion failure type easy-peelable film (SHOLEX Allomer film TP9, Showa Denko Plastic Products) with a thickness of 35 µm was laminated on a biaxial oriented polyethylene terephthalate film with a thickness of 50 µm by a conventional dry lamination process. The resulting laminate was slit into display strips each with a width of 35 mm.

EXAMPLE 3

A cohesion failure type easy-peelable film (SHOLEX Allomer film TPF1, Showa Denko Plastic Products) and a low density polyethylene (LDPE) film, which is generally used in sandwich lamination extrusion, were extruded on a biaxial oriented polyethylene terephthalate (PET) film with a thickness of 50 µm to form a laminate film of PET (50 µm)/LDPE (30 µm)/TPF1 (40 µm). The resulting laminate film was slit into display strips each with a width of 35 mm.

COMPARATIVE EXAMPLE 2

A sealable cast polypropylene (FCMN (trade name), Futamura Chemical Industries) was dry-laminated on coated paper with a basis weight of 90 g/m². A slitter was used to slit the resulting laminate into display strips each with a width of 35 mm.

COMPARATIVE EXAMPLE 3

A biaxial oriented polypropylene film with a thickness of 50 µm was used as a substrate layer. A low density polyethylene layer with a thickness of 30 µm and a general-purpose cast polypropylene film (P1128 (trade name), TOYOBO) with a thickness of 30 µm were laminated in this order on the substrate layer. A slitter was used to slit the resulting laminate into display strips each with a width of 35 mm.

Bags each with a configuration as shown below were heat-sealed to the display strips prepared in Example 1 and Comparative Example 1. Each bag was attached to each display strip using Strip bag Applicator (with a seal jaw shape as shown in FIG. 7b) as disclosed in Japanese Patent Application No. 2002-251846 for Ishida Co., Ltd. The heat sealing was performed under the conditions of 190° C. and 350 msec.

Bag configuration: heat-sealable biaxial oriented polypropylene (OPH) layer (20 µm)/print layer/polyethylene (PE) layer (10 µm)/aluminum vapor-deposited heat-sealable biaxial oriented polypropylene (OPH) layer (20 µm)

The display strip sealed to the bag was slit into fragments with a width of 15 mm. A tensile strength tester (Strograph V1-C, Toyo Seiki Seisaku-sho) was used to monitor a change in the load applied to the sealed portion of the fragment at a pulling rate of 300 mm/min. For comparison, the surface layer (OPH) of the bag was also measured for tensile strength under the same conditions.

Figure 8:
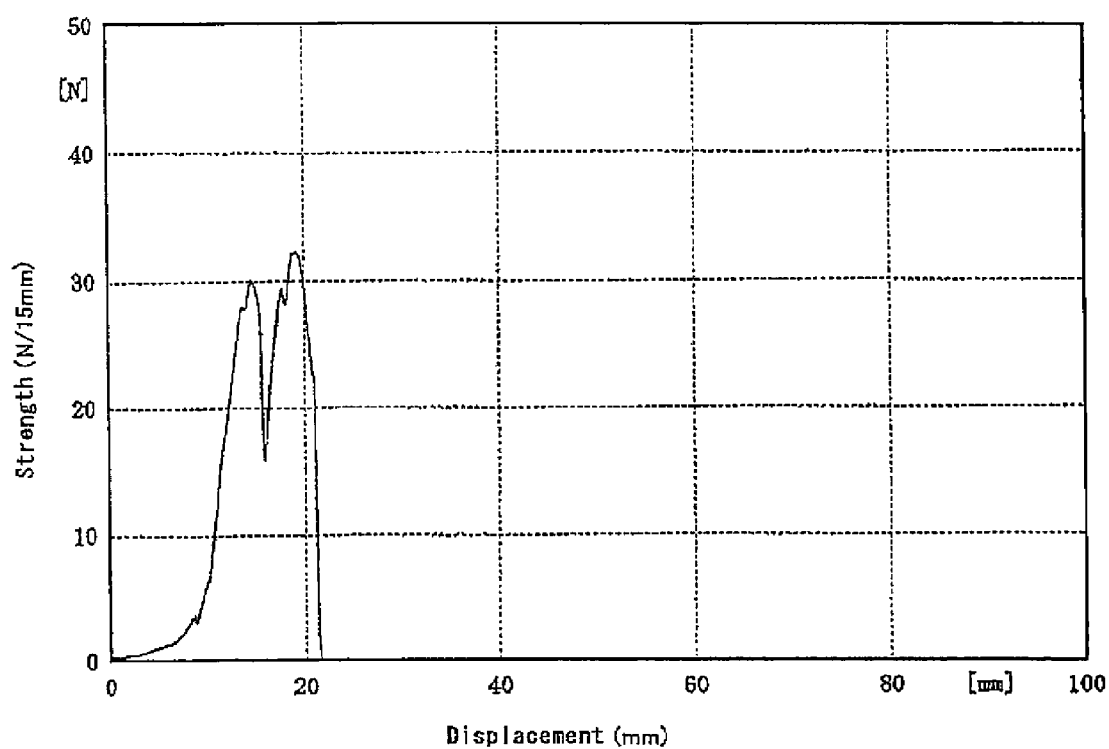
FIG. 8 is a diagram showing how the load changes when the bag is detached from a display strip prepared in Example 1.
Figure 9:
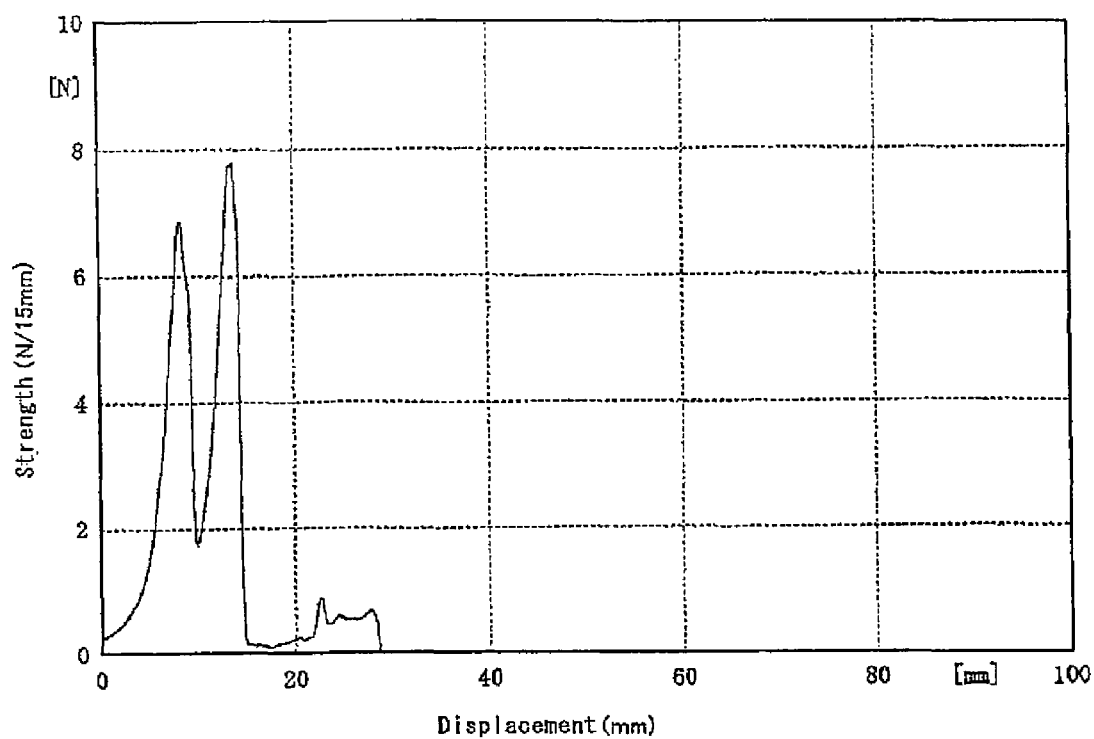
FIG. 9 is a diagram showing how the load changes when the bag is detached from a display strip prepared in Comparative Example 1.
Figure 10:
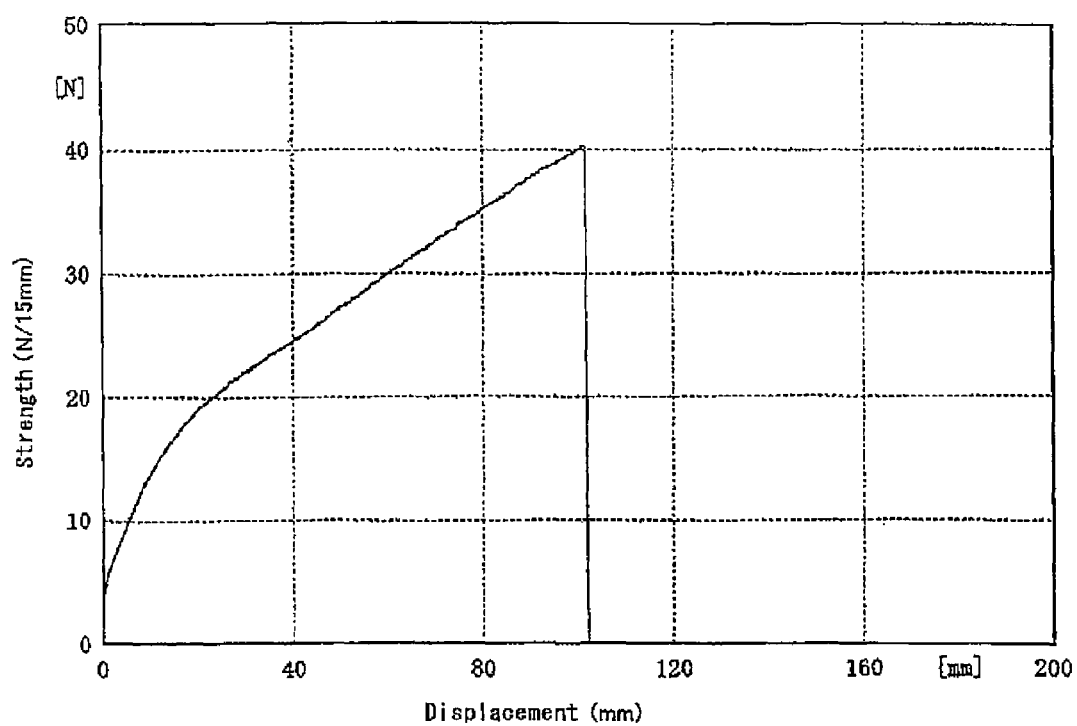
FIG. 10 is a diagram showing the result of the measurement of tensile strength of the surface layer of the bag used in Examples.

FIG. 8 shows a change in the load applied when the bag is detached from the display strip prepared in Example 1. FIG. 9 shows a change in the load applied when the bag is detached from the display strip prepared in Comparative Example 1. FIG. 10 shows the result of the measurement of the tensile strength of the bag surface layer.

As shown in FIG. 10, the bag surface layer has a strength of 40 N. From the display strip prepared in Example 1, the bag was able to be detached by a strength lower than 40 N without having its surface damaged. As shown in FIG. 8, a load corresponding to the initial load was applied to the display strip of Example 1 from the peeling start to the peeling end, though intermittently. In the case of Comparative Example 1 as shown in FIG. 9, the surface layer of the bag was cracked, and the crack extended inside the bag surface layer, and therefore the destruction was allowed to proceed by a force lower than the strength of the bag surface layer.

The prepared samples were packed into a corrugated cardboard carton by hand and then taken out from the carton and displayed. In this process, the accidentally detached products were counted. When the display strip prepared in Example 1 was used, no product was accidentally detached. In contrast, the display strip prepared in Comparative Example 1 had 3 out of 10 products accidentally detached in the packing process, and 4 to 5 out of 10 products accidentally detached during display.

In addition, the display strips prepared in Examples 2 and 3 and Comparative Examples 2 and 3 were evaluated by the following method.

The bag material was prepared a 50 µm thick film with a configuration of sealable biaxial oriented polypropylene layer (20 µm)/low density polyethylene layer (10 µm)/aluminum vapor-deposited sealable biaxial oriented polypropylene layer (20 µm).

The bag material was sealed to each display strip using a heat gradient tester (HEATGRADIENT, Toyo Seiki Seisaku-sho) under the conditions of a sealing temperature of 190° C., a sealing time of 0.5 sec, and a sealing pressure of 0.4 MPa.

The display strip sealed to the bag material was slit into fragments with a width of 15 mm. A tensile strength tester (Strograph V1-C, Toyo Seiki Seisaku-sho) was used to monitor a change in the load applied to the sealed portion of the fragment at a pulling rate of 300 mm/min. Each peeled state was also observed.

As a result, the bag was able to be detached from the display strip prepared in Example 2 or 3 without having its surface damaged. In contrast, the display strip prepared in Comparative Example 2 or 3 allowed the bag surface layer to be cracked, and the breakage extended inside the bag surface layer.

Figure 11:
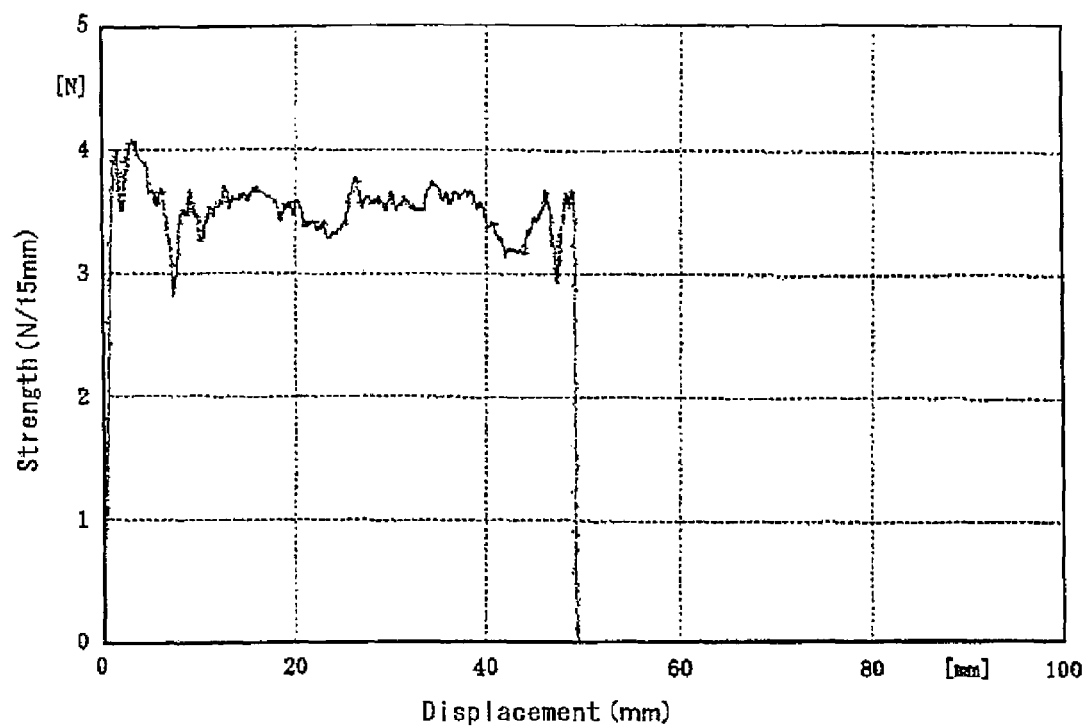
FIG. 11 is a diagram showing how the load changes when the bag is detached from a display strip prepared in Example 2.
Figure 12:
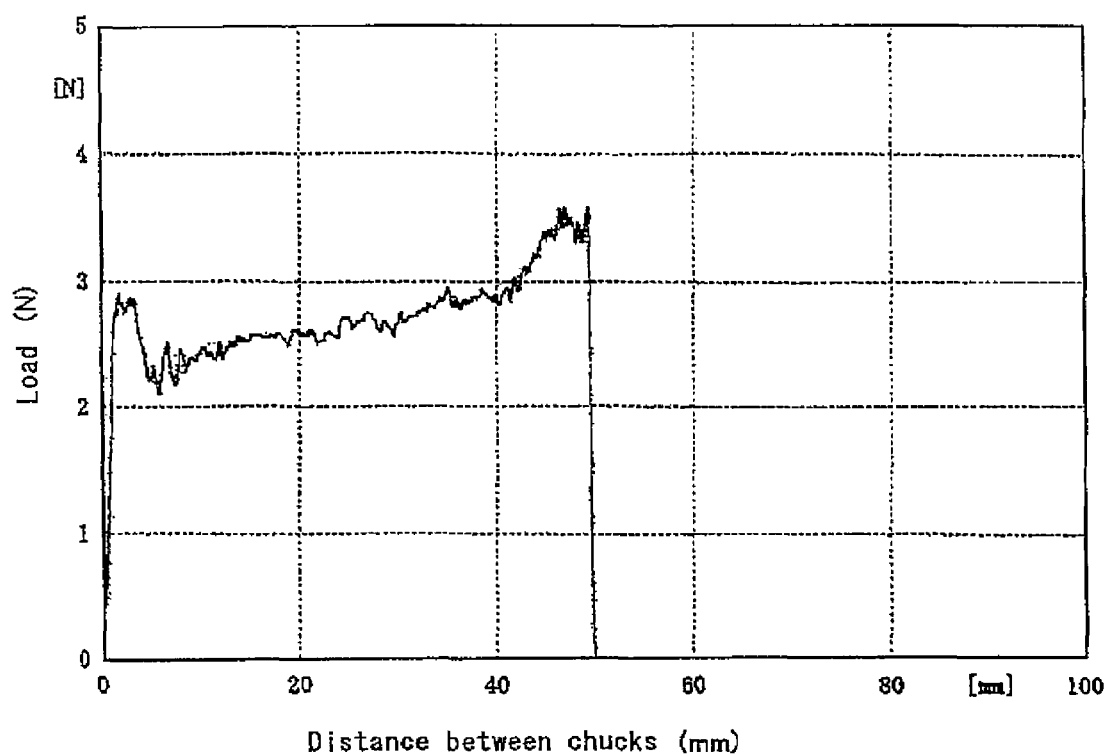
FIG. 12 is a diagram showing how the load changes when the bag is detached form a display strip prepared in Example 3.
Figure 13:
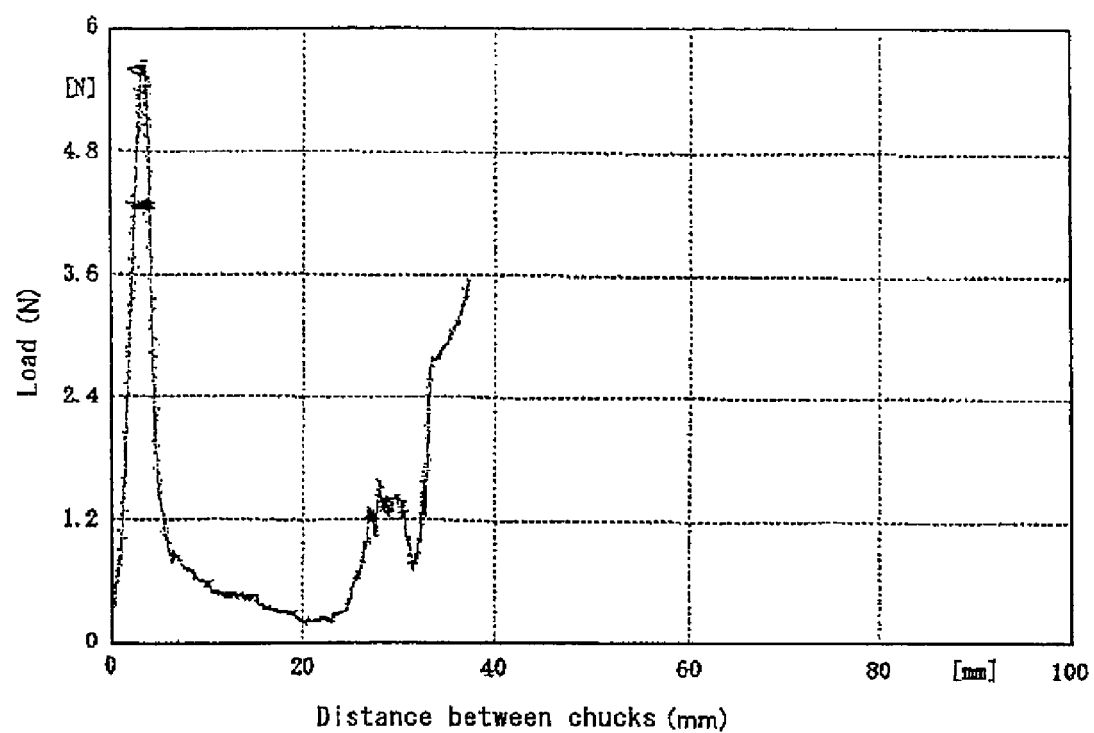
FIG. 13 is a diagram showing how the load changes when the bag is detached from a display strip prepared in Comparative Example 2.
Figure 14:
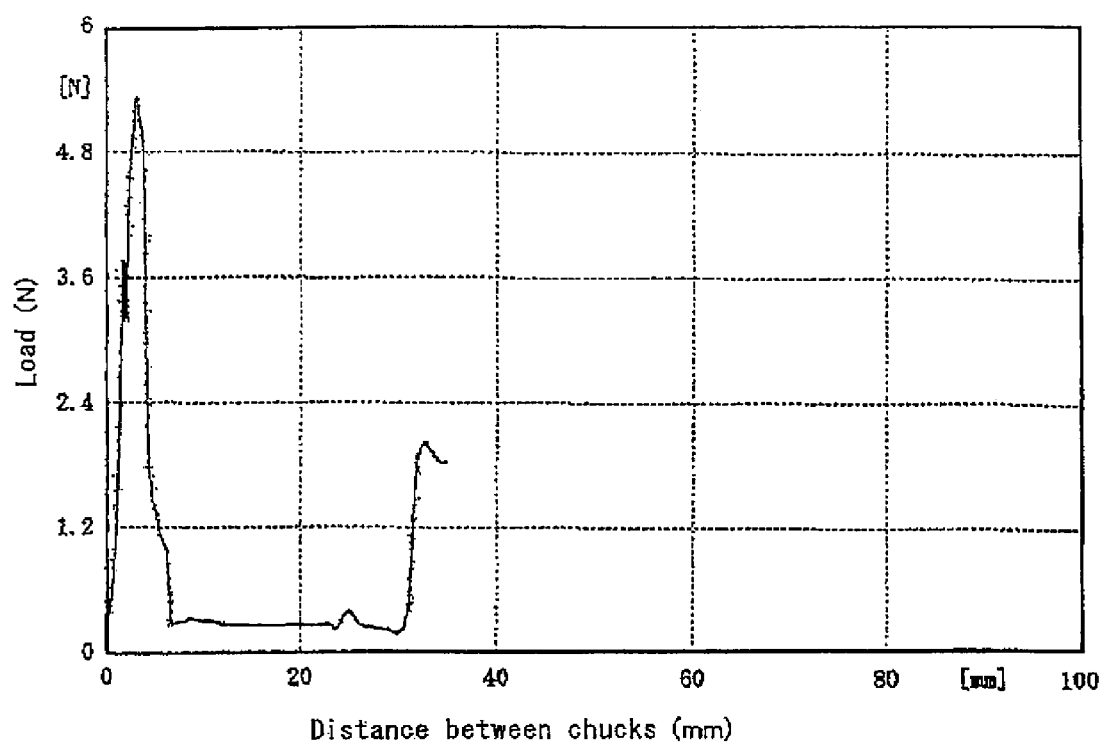
FIG. 14 is a diagram showing how the load changes when the bag is detached form a display strip prepared in Comparative Example 3.

FIGS. 11 and 12 show the results of the measurement of the change in load on the display strips prepared in Examples 2 and 3, respectively. FIGS. 13 and 14 show the results of the measurement on the display strips prepared in Comparative Examples 2 and 3, respectively.

The comparison between FIGS. 11 to 12 and FIGS. 13 to 14 indicates that in the case of the display strip prepared in Comparative Example 2 or 3, a slightly higher initial load was applied, but a crack extended from the bag surface to the inside of the bag surface layer so that the load is significantly reduced. In FIGS. 13 and 14, the load significantly decreases and then increases again at a certain time near the separation time. This is simply because the seal samples were continuously prepared so that the start portion of the measurement of the next sample strength was indicated.

EXAMPLE 4

Figure 15:
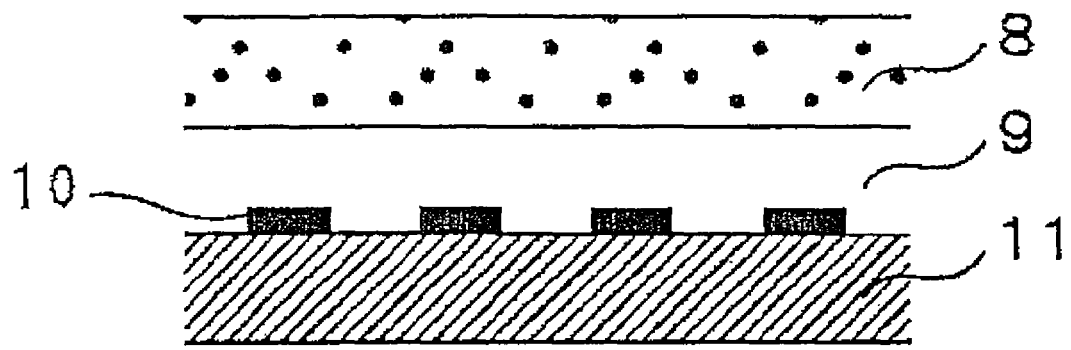
FIG. 15 is a schematic view showing a cross-section of a display strip prepared in Example 4.

A biaxial oriented polyethylene terephthalate film with a thickness of 50 µm is used as a substrate layer. A print layer, a polyethylene layer with a thickness of 30 µm, and a transparent sealant layer of a cast polypropylene film with a thickness of 20 µm containing a styrene-butadiene copolymer as a component for cohesion failure are laminated in this order on the substrate layer. A slitter is used to slit the resulting laminate into display strips each with a width of 35 mm. The resulting display strip has a cross-section as schematically shown in FIG. 15.

EXAMPLE 5

Figure 16:
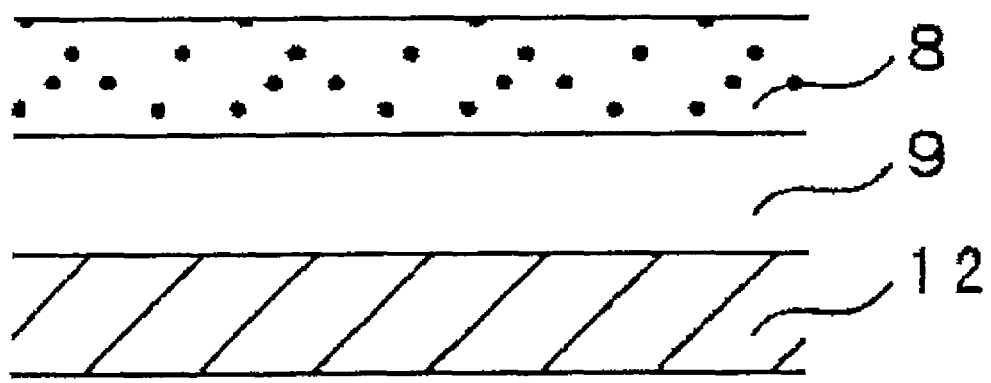
FIG. 16 is a schematic view showing a cross-section of a display strip prepared in Example 5.

Paper with a basis weight of 70 g/m² is used as a substrate layer. A polyethylene layer with a thickness of 30 µm and a transparent sealant layer of a cast polypropylene film with a thickness of 20 µm containing the styrene-butadiene copolymer (the same as that used in Example 4) are laminated in this order on the substrate layer. A slitter is used to slit the resulting laminate into display strips each with a width of 35 mm. The resulting display strip has a cross-section as schematically shown in FIG. 16.

EXAMPLE 6

A cohesion failure type easy-peelable film (013C (CMPS series), Tohcello) with a thickness of 50 μm is laminated on a biaxial oriented polyethylene terephthalate film with a thickness of 50 μm by a conventional dry lamination process. The resulting laminate is slit into display strips each with a width of 35 mm.

EXAMPLE 7

An extrusion film (PB-1) comprising a propylene-ethylene copolymer, polyethylene and polybutene-1, and a low density polyethylene (LDPE) film, which is generally used in sandwich lamination extrusion, are extruded on a biaxial oriented polyethylene terephthalate (PET) film with a thickness of 50 μm to form a laminate film of PET (50 μm)/LDPE (30 μm)/PB-1 (50 μm). The resulting laminate film is slit into display strips each with a width of 35 mm.

EXAMPLE 8

A cohesion failure type easy-peelable VMX film (XB15FT, J-Film) and a low density polyethylene (LDPE) film, which is generally used in sandwich lamination extrusion, are extruded on a biaxial oriented polyethylene terephthalate (PET) film with a thickness of 50 μm to form a laminate film of PET (50 μm)/LDPE (20 μm)/XB15FT (30 μm). The resulting laminate film is slit into display strips each with a width of 35 mm.

EXAMPLE 9

A biaxial oriented polyethylene terephthalate (PET) film with a thickness of 12 μm is used as a substrate. In a tandem laminator, the substrate and a cohesion failure type easy-peelable film (Allomer film TP6, Showa Denko Plastic Products) are subjected to sandwich lamination extrusion together with a polyethylene film and an aluminum vapor-deposited biaxial oriented polyethylene terephthalate (VMAL-PET) film to form a five-layer film of PET (12 μm)/PE (12 μm)/VMAL-PET (12 μm)/PE (12 μm)/TP6 (35 μm). The resulting five-layer film is slit into display strips each with a width of 35 mm.

EXAMPLE 10

Printing is carried out on a biaxial oriented polypropylene film with a thickness of 30 μm. Aluminum is vapor-deposited on one side of a cohesion failure type easy-peelable film (Allomer film TPF-1, Showa Denko Plastic Products) with a thickness of 40 μm. By a conventional dry lamination process, the resulting two films are laminated so as to have the printed face and the aluminum deposited face joined, resulting in a laminate film. The laminate film is slit into display strips each with a width of 35 mm.

EXAMPLE 11

A cohesion failure type easy-peelable film (Allomer film TPF-1, Showa Denko Plastic Products) with one side aluminum vapor-deposited and an ethylene-acrylic acid copolymer (EAA) film are laminated, by extrusion, on a printed face of a one side-printed biaxial oriented polyethylene terephthalate (PET) film with a thickness of 25 μm to form a laminate film of PET (25 μm)/print layer/EAA (15 μm)/VM-AlTPF-1 (40 μm). The resulting laminate film is slit into display strips each with a width of 35 mm.

EXAMPLE 12

A biaxial oriented polyethylene terephthalate film with a thickness of 50 μm is used as a substrate layer. A low density polyethylene layer with a thickness of 30 μm and a sealant layer of a cohesion failure type easy-peelable cast polypropylene film with a thickness of 40 μm are laminated in this order on the substrate layer. The cast polypropylene film is composed of an 8 μm thick adhesive layer comprising a resin composition that contains 60% by weight of single site-catalyzed linear polyethylene, 20% by weight of a simple propylene polymer, and 20% by weight of a hydrogenated styrene-butadiene polymer in which the styrene content is 67% by weight; and a 32 μm thick supporting layer comprising a resin composition that contains 40% by weight of a propylene-ethylene random copolymer in which the ethylene content is 4.5% by weight and 60% by weight of linear polyethylene. A slitter is used to slit the resulting laminate into display strips each with a width of 35 mm.

EXAMPLE 13

A biaxial oriented polypropylene film with a thickness of 50 μm is used as a substrate layer. A low density polyethylene layer with a thickness of 30 μm and a sealant layer of a cohesion failure type easy-peelable cast polypropylene film (FCMSO (trade name), Futamura Chemical Industries) with a thickness of 20 μm are laminated in this order on the substrate layer. A slitter is used to slit the resulting laminate into display strips each with a width of 35 mm.

EXAMPLE 14

The process of Example 4 is used to form a display strip except that an adhesive (NONSOLBOND (a mixture of trade Nos. XC-231 (base material) and XA-126 (curing agent) in a ratio of 10:4), Dainichiseika Color & Chemicals) is used in place of the 30 μm thick low density polyethylene layer and that 1.0 g/m$^2$ of the adhesive is applied by dry lamination to bond the substrate layer to the sealant layer.

EXAMPLE 15

The process of Example 4 is used to form a display strip except that an adhesive (Takelac A969V/Takenate A5 (trade name), Takeda Chemical Industries) is used in place of the 30 μm thick low density polyethylene layer and that 1.0 g/m$^2$ of the adhesive is applied by dry lamination to bond the substrate layer to the sealant layer.

INDUSTRIAL APPLICABILITY

According to the present invention, the process of attaching the product-enclosed bags to the inventive display strip can easily be automated. According to the present invention, the product-enclosed bags can easily be detached from the inventive display strip without having their appearance degraded.

The invention claimed is:

1. A combination of a display strip and a plurality of bags having products enclosed therein attached to the display strip for the purpose of arrangement and display, the combination comprising,
the plurality of bags and the display strip, wherein:
the display strip comprises at least a substrate layer and a heat-sealable sealant layer (A), said sealant layer (A) comprising an adhesive component and a component for cohesive failure, and
an outer surface of each of the plurality of bags comprises a sealant layer (B), said sealant layer not containing a component for cohesive failure,
the sealant layer (A) of the display strip is bonded to the outer surface of the bag by heat sealing, wherein said cohesion failure in the display strip or the sealant layer (A) occurs by a force lower than the tensile break strength of the bag surface layer,
whereby when the outer surface of the bag bonded to the sealant layer (A) of the display strip by heat sealing is peeled from the sealant layer (A), the sealant layer (A) is broken without damaging the bag structure or appearance of the bag.

2. The combination according to claim 1, wherein the bag further comprising a substrate layer (B), and the sealant layer (B) and the substrate layer (B) of the bag are laminated via an adhesive.

3. The combination according to claim 1, wherein the bag further comprising a substrate layer (B), the sealant layer (B) and the substrate layer (B) of the bag are laminated via an intermediate layer.

4. The combination according to claim 3, wherein the sealant layer (B) and the intermediate layer of the bag are laminated via an adhesive.

5. The combination according to claim 1, wherein the adhesive component is at least one selected from the group consisting of a polypropylene, a copolymer of propylene and any other olefin and low density polyethylene.

6. The combination according to claim 1, wherein the sealant layer (A) of the display strip comprises a plurality of layers including an adhesive layer for adhering to the bag outer surface by heat sealing and a supporting layer for supporting the adhesive layer.

7. The combination according to claim 1, wherein the substrate layer of the display strip comprises at least one component selected from the group consisting of biaxial oriented polypropylene, biaxial oriented polyethylene terephthalate, metal foil and paper.

8. The combination according to claim 1, wherein the substrate layer and the sealant layer (A) of the display strip are stacked with an adhesive.

9. The combination according to claim 1, wherein a layer comprising polyethylene, an ethylene-(meth)acrylic acid copolymer or an ionomer of the ethylene(meth)acrylic acid copolymer is stacked between the substrate layer and the sealant layer (A) of the display strip.

10. The combination according to claim 1, wherein said sealant layer (A) comprises a plurality of layers including a peelable layer and a heat sealable layer.

* * * * *